(No Model.)

A. JACOBY.
GRIDDLE.

No. 434,788. Patented Aug. 19, 1890.

Witnesses.
Wm. S. Hodges.
Geo. W. Smith.

Inventor.
By Augusta Jacoby
Patrick O'Farrell
Attorney

UNITED STATES PATENT OFFICE.

AUGUSTA JACOBY, OF LANGHORNE, PENNSYLVANIA.

GRIDDLE.

SPECIFICATION forming part of Letters Patent No. 434,788, dated August 19, 1890.

Application filed May 12, 1890. Serial No. 351,426. (No model.)

*To all whom it may concern:*

Be it known that I, AUGUSTA JACOBY, a citizen of the United States of America, residing at Langhorne, in the county of Bucks and State of Pennsylvania, have invented certain new and useful Improvements in Griddles, of which the following is a specification, reference being had therein to the accompanying drawings.

This invention pertains to certain new and useful improvements in griddles, having for its object the production of a cheap, simple, and highly-efficient device of this class for gas or gasoline stoves.

The invention comprises a rigid section and a movable or pivoted section designed to fit in a frame of said rigid section and to close down over a pan formed by the other half thereof, the connection between said rigid and movable sections being effected by a continuous wire passed through coincident lugs and having handles connected to its ends, substantially as hereinafter fully set forth, and particularly pointed out in the claims.

Figure 1:
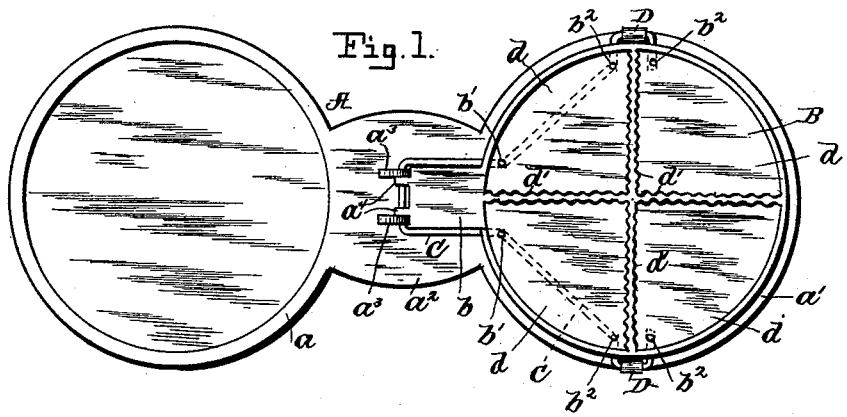
Figure 2:
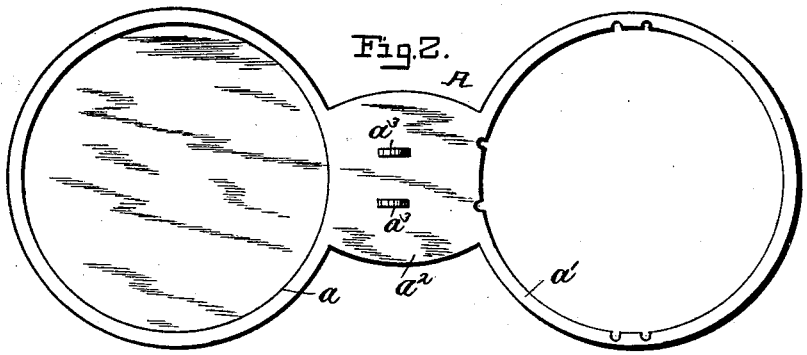
Figure 3:
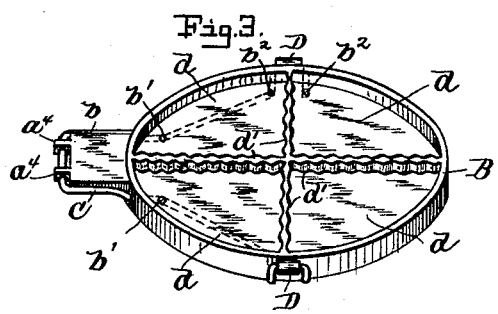
Figure 4:
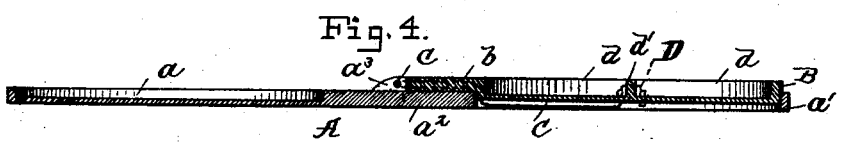

In the accompanying drawings, Figure 1 is a plan view of my improved griddle. Fig. 2 is a similar view with the movable section removed. Fig. 3 is a perspective view of said latter section. Fig. 4 is a central longitudinal view of the entirety.

Referring to the drawings, A designates the rigid section, which consists of a circular chambered ring or pan $a$ and a skeleton ring or frame $a'$. The pan $a$ and frame $a'$ are connected to or formed with a central head or connecting-neck $a^2$, from the upper surface of which project two parallel apertured lugs $a^3$.

B is a movable section, consisting of a chambered ring or pan having a short plate $b$, from which extend two parallel apertured lugs $a^4$. The apertures of the lugs $a^3$ $a^4$ are designed to coincide, and through them is passed a stiff wire C, which effects the hinging connection between the parts. This wire C is secured to the under side of section B by rivets $b'$, and its ends are passed through apertures of section B, and rounded handles D located on opposite sides of said section. The wire is secured by rivets $b^2$ $b^2$, adjacent each handle, so as to hold the latter in place.

The pan or movable section B is preferably divided into four separate chambers or compartments $d$, separated by intersecting flanges $d'$, having fluted surfaces.

In practice the pan or section B is placed within the ring or frame $a'$, and after the batter placed in its compartment is sufficiently cooked on one side said section is turned on its hinges and its contents are transferred to pan $a$, with pan B bearing thereon. In this manner the batter is thoroughly cooked on both sides, and the transferring of the cakes from one pan to the other is readily and easily accomplished.

I claim as my invention—

1. A griddle for gas or gasoline stoves, consisting of a stationary ring or circular pan, apertured lugs, and the movable section or pan having lugs coincident with said former lugs, and the wire passed through the apertures of said lugs, and the handle secured by said wire, substantially as set forth.

2. A griddle for gas or gasoline stoves, consisting of a rigid section having a chambered ring or pan, a ring or skeleton frame, a connecting-neck having apertured lugs, a movable section or chambered pan having apertured lugs, the wire passed through the coincident apertures of said lugs, and the handles held by said wire, substantially as set forth.

In testimony whereof I affix my signature in presence of two witnesses.

AUGUSTA JACOBY.

Witnesses:
OSCAR JACOBY,
C. W. UEBELHOAR.